United States Patent
Menendez-Pidal et al.

(10) Patent No.: US 6,785,648 B2
(45) Date of Patent: Aug. 31, 2004

(54) SYSTEM AND METHOD FOR PERFORMING SPEECH RECOGNITION IN CYCLOSTATIONARY NOISE ENVIRONMENTS

(75) Inventors: Xavier Menendez-Pidal, Los Gatos, CA (US); Gustavo Hernandez Abrego, Sunnyvale, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 636 days.

(21) Appl. No.: 09/872,196

(22) Filed: May 31, 2001

(65) Prior Publication Data

US 2002/0188444 A1 Dec. 12, 2002

(51) Int. Cl.[7] ................................................ G10L 15/20
(52) U.S. Cl. ........................ 704/233; 704/234; 704/226
(58) Field of Search ................................ 704/233, 234, 704/226, 237, 224, 270, 275

(56) References Cited

U.S. PATENT DOCUMENTS

| | | | | |
|---|---|---|---|---|
| 5,574,824 A | * | 11/1996 | Slyh et al. .................. | 704/226 |
| 5,761,639 A | * | 6/1998 | Takebayashi et al. ........ | 704/253 |
| 5,812,972 A | * | 9/1998 | Juang et al. ................. | 704/234 |
| 6,070,140 A | * | 5/2000 | Tran ........................... | 704/275 |
| 6,266,633 B1 | * | 7/2001 | Higgins et al. ............. | 704/224 |
| 6,687,672 B2 | * | 2/2004 | Souilmi et al. ............. | 704/237 |

* cited by examiner

Primary Examiner—Susan McFadden
(74) Attorney, Agent, or Firm—Gregory J. Koerner; Simon & Koerner LLP

(57) ABSTRACT

A system and method for performing speech recognition in cyclostationary noise environments includes a characterization module that may access original cyclostationary noise from an intended operating environment of a speech recognition device. The characterization module may then convert the original cyclostationary noise into target stationary noise which retains characteristics of the original cyclostationary noise. A conversion module may then generate a modified training database by utilizing the target stationary noise to modify an original training database that was prepared for training a recognizer in the speech recognition device. A training module may then train the recognizer with the modified training database to thereby optimize speech recognition procedures in cyclostationary noise environments.

43 Claims, 8 Drawing Sheets ately modified training database that then advantageously incorporates characteristics of the original cyclostationary noise to improve performance of the speech recognition device.

SYSTEM AND METHOD FOR PERFORMING SPEECH RECOGNITION IN CYCLOSTATIONARY NOISE ENVIRONMENTS

BACKGROUND SECTION

1. Field of the Invention

This invention relates generally to electronic speech recognition systems, and relates more particularly to a method for performing speech recognition in cyclostationary noise environments.

2. Description of the Background Art

Implementing an effective and efficient method for system users to interface with electronic devices is a significant consideration of system designers and manufacturers. Automatic speech recognition is one promising technique that allows a system user to effectively communicate with selected electronic devices, such as digital computer systems. Speech typically consists of one or more spoken utterances which may each include a single word or a series of closely-spaced words forming a phrase or a sentence.

An automatic speech recognizer typically builds a comparison database for performing speech recognition when a potential user "trains" the recognizer by providing a set of sample speech. Speech recognizers tend to significantly degrade in performance when a mismatch exists between training conditions and actual operating conditions. Such a mismatch may result from various types of acoustic distortion.

Conditions with significant ambient background-noise levels present additional difficulties when implementing a speech recognition system. Examples of such noisy conditions may include speech recognition in automobiles or in certain other mechanical devices. In such user applications, in order to accurately analyze a particular utterance, a speech recognition system may be required to selectively differentiate between a spoken utterance and the ambient background noise.

Referring now to FIG. 1(a), an exemplary waveform diagram for one embodiment of clean speech 112 is shown. In addition, FIG. 1(b) depicts an exemplary waveform diagram for one embodiment of noisy speech 114 in a particular operating environment. In FIGS. 1(a) and 1(b), waveforms 112 and 114 are presented for purposes of illustration only. A speech recognition process may readily incorporate various other embodiments of speech waveforms.

From the foregoing discussion, it therefore becomes apparent that compensating for various types of ambient noise remains a significant consideration of designers and manufacturers of contemporary speech recognition systems.

SUMMARY

In accordance with the present invention, a method is disclosed for performing speech recognition in cyclostationary noise environments. In one embodiment of the present invention, initially, original cyclostationary noise from an intended operating environment of a speech recognition device may preferably be provided to a characterization module that may then preferably perform a cyclostationary noise characterization process to generate target stationary noise, in accordance with the present invention.

In certain embodiments, the original cyclostationary noise may preferably provided to a Fast Fourier Transform (FFT) from the characterization module. The FFT may then preferably generate frequency-domain data by converting the original cyclostationary noise from the time domain to the frequency domain to produce a cyclostationary noise frequency-power distribution. The cyclostationary noise frequency-power distribution may include an array file with groupings of power values that each correspond to a different frequency, wherein the groupings each correspond to a different time frame.

An averaging filter from the characterization module may then access the cyclostationary noise frequency-power distribution, and responsively generate an average cyclostationary noise frequency-power distribution using any effective techniques or methodologies. For example, the averaging filter may calculate an average cyclostationary power value for each frequency of the cyclostationary noise frequency-power distribution across the different time frames to thereby produce the average cyclostationary noise frequency-power distribution which includes stationary characteristics of the original cyclostationary noise.

Next, white noise with a flat power distribution across a frequency range may preferably be provided to the Fast Fourier Transform (FFT) of the characterization module. The FFT may then preferably generate frequency-domain data by converting the white noise from the time domain to the frequency domain to produce a white noise frequency-power distribution that may preferably include a series of white noise power values that each correspond to a different frequency.

A modulation module of the characterization module may preferably access the white noise frequency-power distribution, and may also access the foregoing average cyclostationary noise frequency-power distribution. The modulation module may then modulate white noise power values of the white noise frequency-power distribution with corresponding cyclostationary power values from the average cyclostationary noise frequency-power distribution to advantageously generate a target stationary noise frequency-power distribution.

In certain embodiments, the modulation module may preferably generate individual target stationary power values of the target stationary noise frequency-power distribution by multiplying individual white noise power values of the white noise frequency-power distribution with corresponding individual cyclostationary power values from the average cyclostationary noise frequency-power distribution on a frequency-by-frequency basis. An Inverse Fast Fourier Transform (IFFT) of the characterization module may then preferably generate target stationary noise by converting the target stationary noise frequency-power distribution from the frequency domain to the time domain.

A conversion module may preferably access an original training database that was recorded for training a recognizer of the speech recognition device based upon an intended speech recognition vocabulary of the speech recognition device. The conversion module may then preferably generate a modified training database by utilizing the target stationary noise to modify the original training database. In practice, the conversion module may add the target stationary noise to the original training database to produce the modified training database that then advantageously incorporates characteristics of the original cyclostationary noise to improve performance of the speech recognition device.

A training module may then access the modified training database for training the recognizer. Following the foregoing training process, the speech recognition device may then effectively utilize the trained recognizer to optimally perform various speech recognition functions. The present invention thus efficiently and effectively performs speech recognition in cyclostationary noise environments.

DETAILED DESCRIPTION

The present invention relates to an improvement in speech recognition systems. The following description is presented to enable one of ordinary skill in the art to make and use the invention, and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention comprises a system and method for performing speech recognition in cyclostationary noise environments, and may preferably include a characterization module that may preferably access original cyclostationary noise from an intended operating environment of a speech recognition device. The characterization module may then preferably convert the original cyclostationary noise into target stationary noise which retains characteristics of the original cyclostationary noise. A conversion module may then preferably generate a modified training database by utilizing the target stationary noise to modify an original training database that was prepared for training a recognizer in the speech recognition device. A training module may then advantageously train the recognizer with the modified training database to thereby optimize speech recognition procedures in cyclostationary noise environments.

Figure 1:
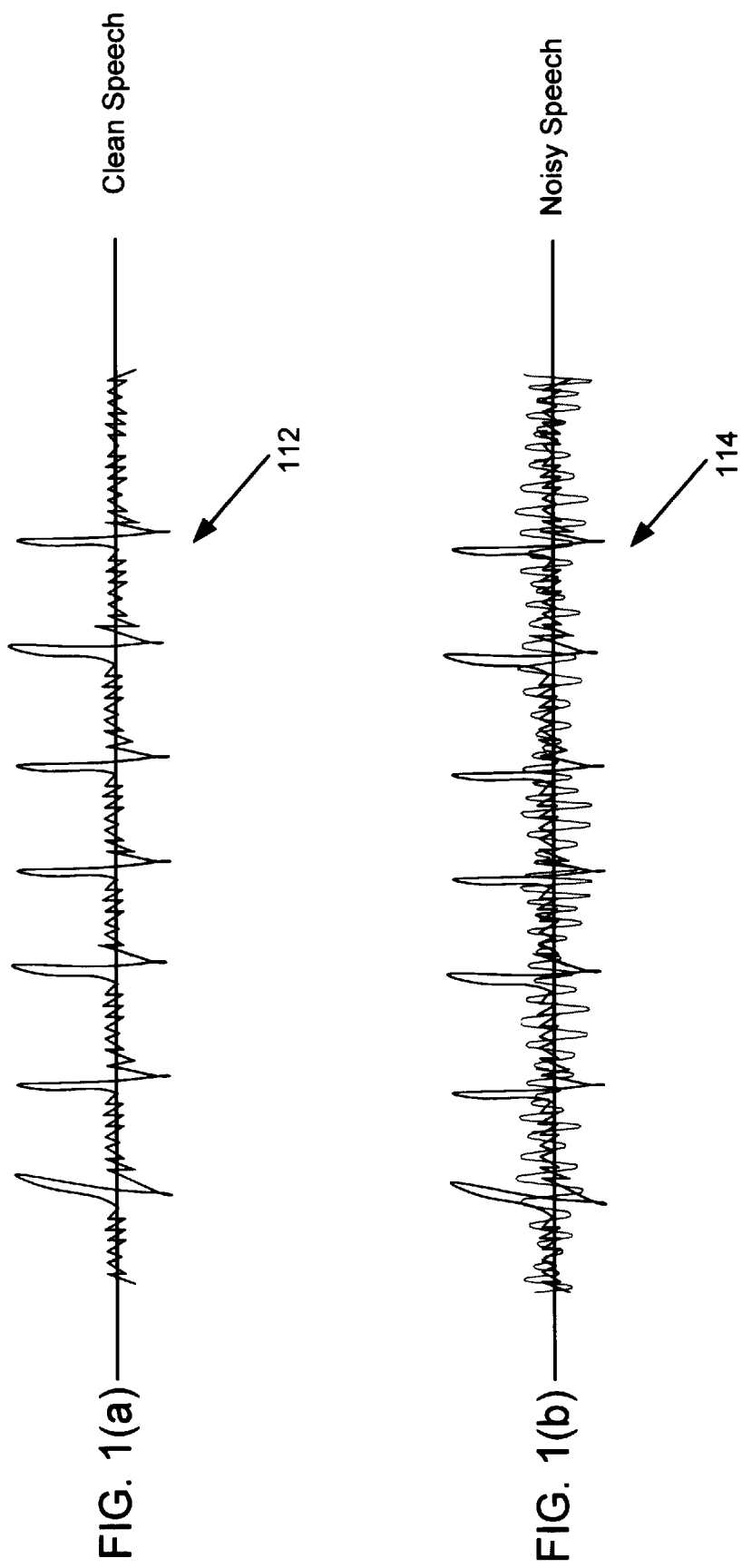
FIG. 1(a) is an exemplary waveform diagram for one embodiment of clean speech.
FIG. 1(b) is an exemplary waveform diagram for one embodiment of noisy speech.
Figure 2:
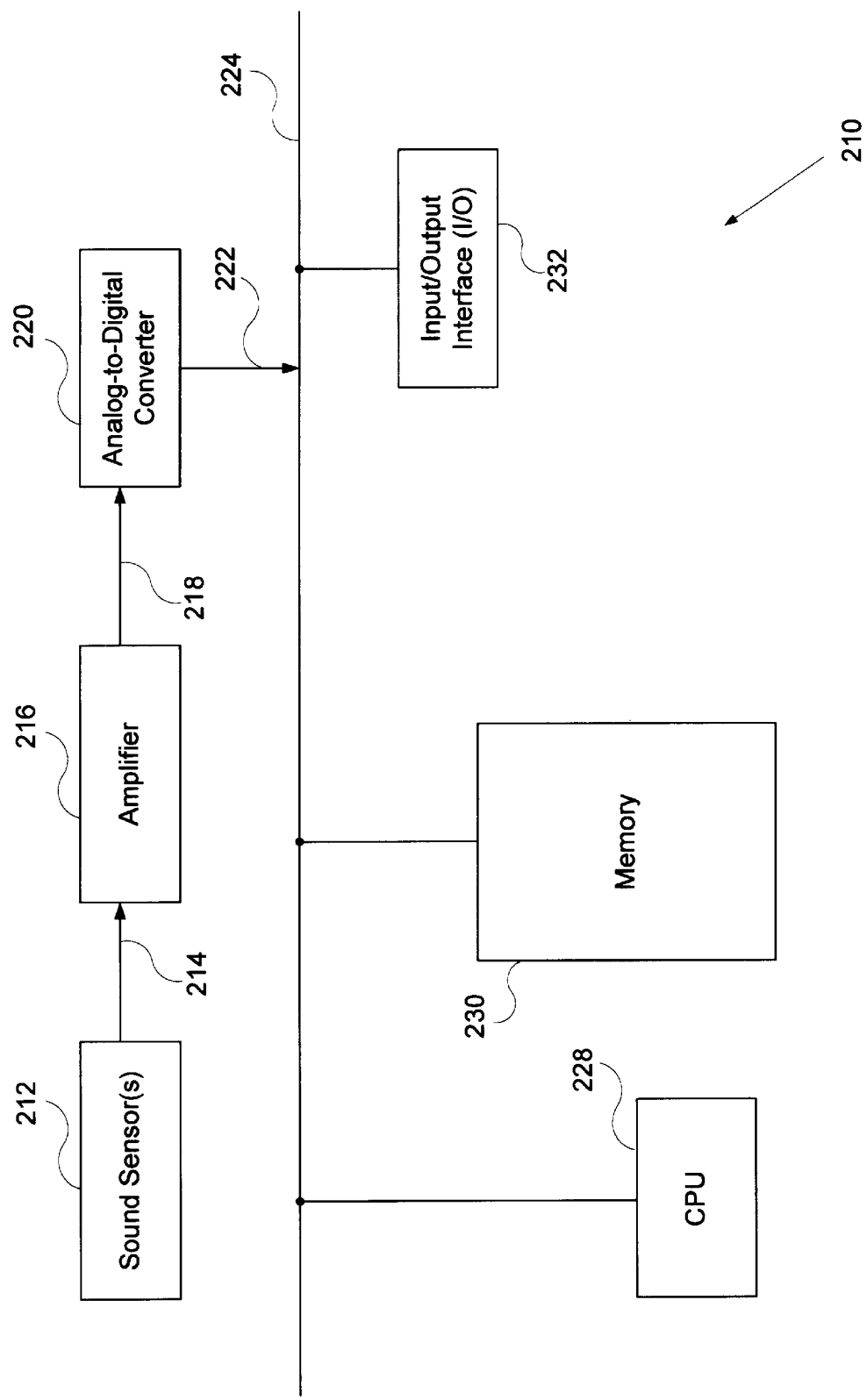
FIG. 2 is a block diagram of one embodiment for a computer system, in accordance with the present invention.

Referring now to FIG. 2, a block diagram of one embodiment for a computer system 210 is shown, in accordance with the present invention. The FIG. 2 embodiment includes a sound sensor 212, an amplifier 216, an analog-to-digital converter 220, a central processing unit (CPU) 228, a memory 230 and an input/output device 232.

In operation, sound sensor 212 may be implemented as a microphone that detects ambient sound energy and converts the detected sound energy into an analog speech signal which is provided to amplifier 216 via line 214. Amplifier 216 amplifies the received analog speech signal and provides an amplified analog speech signal to analog-to-digital converter 220 via line 218. Analog-to-digital converter 220 then converts the amplified analog speech signal into corresponding digital speech data and provides the digital speech data via line 222 to system bus 224.

CPU 228 may then access the digital speech data on system bus 224 and responsively analyze and process the digital speech data to perform speech recognition according to software instructions contained in memory 230. The operation of CPU 228 and the software instructions in memory 230 are further discussed below in conjunction with FIGS. 3–8. After the speech data is processed, CPU 228 may then advantageously provide the results of the speech recognition analysis to other devices (not shown) via input/output interface 232.

Figure 3:
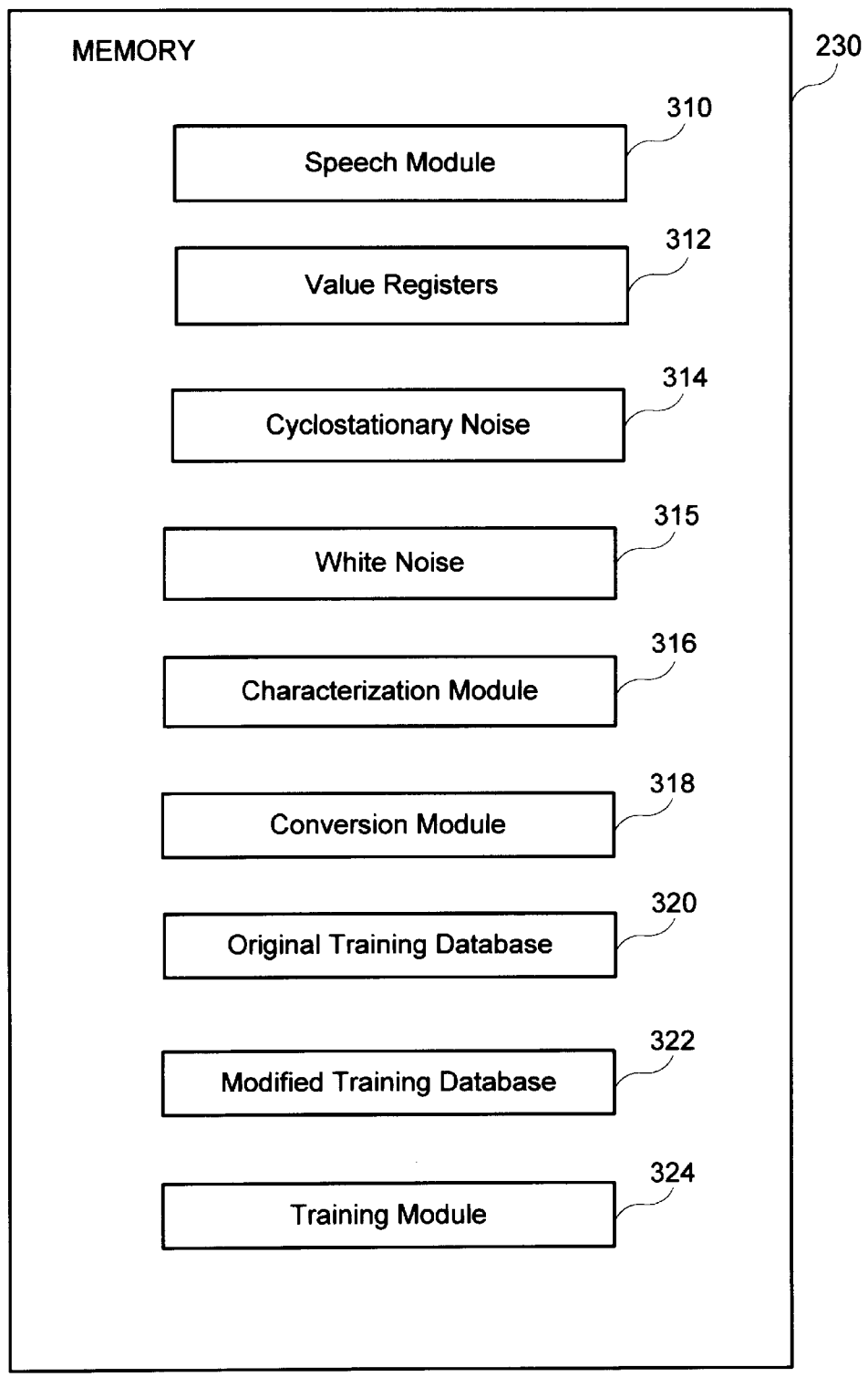
FIG. 3 is a block diagram of one embodiment for the memory of FIG. 2, in accordance with the present invention.

Referring now to FIG. 3, a block diagram of one embodiment for memory 230 of FIG. 2 is shown. Memory 230 may alternatively comprise various storage-device configurations, including Random-Access Memory (RAM) and non-volatile storage devices such as floppy-disks or hard disk-drives. In the FIG. 3 embodiment, memory 230 may preferably include, but is not limited to, a speech module 310, value registers 312, cyclostationary noise 314, white noise 316, a characterization module 316, a conversion module 318, an original training database, a modified training database, and a training module.

In the preferred embodiment, speech module 310 includes a series of software modules which are executed by CPU 228 to analyze and recognizes speech data, and which are further described below in conjunction with FIG. 4. In alternate embodiments, speech module 310 may readily be implemented using various other software and/or hardware configurations. Value registers 312, cyclostationary noise 314, white noise 315, characterization module 316, conversion module 318, original training database 320, modified training database 322, and training module 324 are preferably utilized to effectively perform speech recognition in cyclostationary noise environments, in accordance with the present invention. The utilization and functionality of value registers 312, cyclostationary noise 314, white noise 315, characterization module 316, conversion module 318, original training database 320, modified training database 322, and training module 324 are further described below in conjunction with FIG. 5 through FIG. 8.

Figure 4:
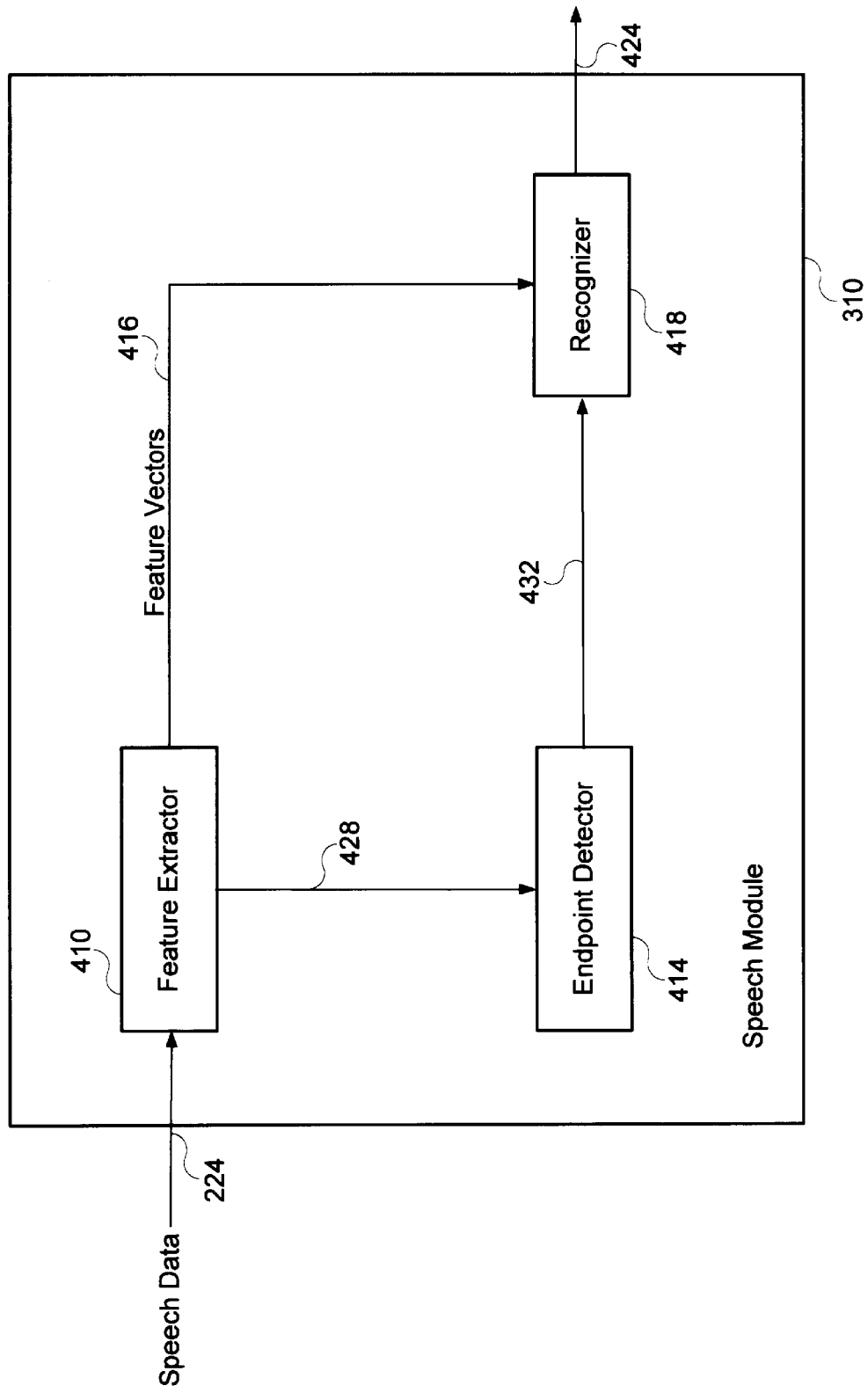
FIG. 4 is a block diagram of one embodiment for the speech module of FIG. 3, in accordance with the present invention.

Referring now to FIG. 4, a block diagram for one embodiment of the FIG. 3 speech module 310 is shown. In the FIG. 3 embodiment, speech module 310 includes a feature extractor 410, an endpoint detector 414, and a recognizer 418.

In operation, analog-to-digital converter 220 (FIG. 2) provides digital speech data to feature extractor 410 within speech module 310 via system bus 224. Feature extractor 410 responsively generates feature vectors which are then provided to recognizer 418 via path 416. Endpoint detector 414 analyzes speech energy received from feature extractor 410, and responsively determines endpoints (beginning and ending points) for the particular spoken utterance represented by the speech energy received via path 428. Endpoint detector 414 then provides the calculated endpoints to recognizer 418 via path 432. Recognizer 418 receives the feature vectors via path 416 and the endpoints via path 432, and responsively performs a speech recognition procedure to advantageously generate a speech recognition result to CPU 228 via path 424. In the FIG. 4 embodiment, recognizer 418 may effectively be implemented as a Hidden Markov Model (HMM) recognizer.

Figure 5:
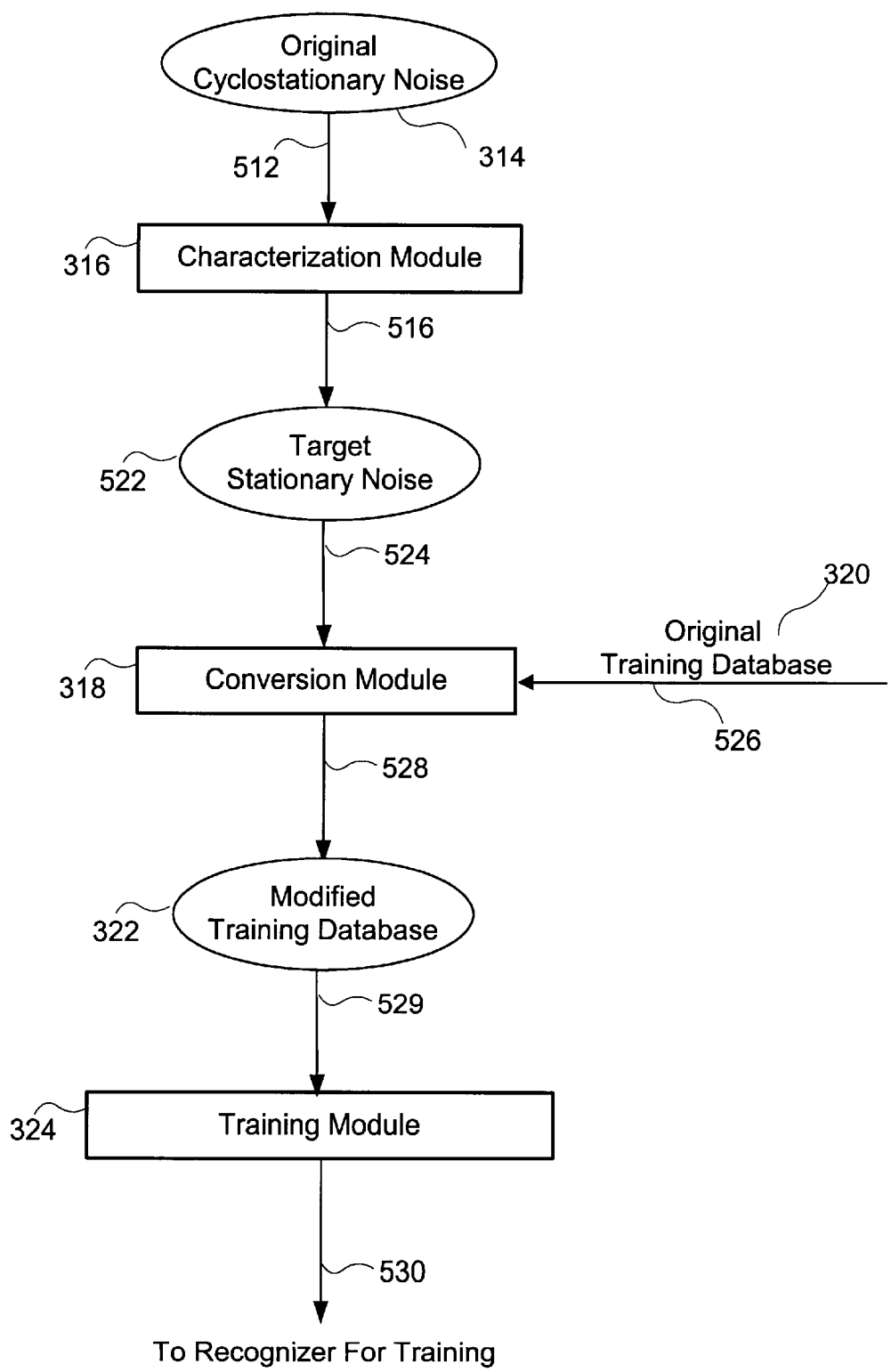
FIG. 5 is a block diagram illustrating a cyclostationary noise equalization procedure, in accordance with one embodiment of the present invention.

Referring now to FIG. 5, a block diagram illustrating a cyclostationary noise equalization procedure is shown, in accordance with one embodiment of the present invention. In alternate embodiments, the present invention may preferably perform a cyclostationary noise equalization procedure using various other elements or functionalities in addition to, or instead of, those elements or functionalities discussed in conjunction with the FIG. 5 embodiment.

In addition, the FIG. 5 embodiment is discussed within the context of cyclostationary noise in an intended operating environment of a speech recognition system. However, in alternate embodiments, the principles and techniques of the present invention may similarly be utilized to compensate for various other types of acoustic properties. For example, various techniques of the present invention may be utilized to compensate for various other types of noise and other acoustic artifacts.

In the FIG. 5 embodiment, initially, original cyclostationary noise 314 from an intended operating environment of speech module 310 is captured and provided to characterization module 316 via path 512. In the FIG. 5 embodiment and elsewhere in this document, original cyclostationary noise 314 may preferably include relatively stationary ambient noise that has a repeated cyclical pattern. For example, if the power values of cyclostationary noise are plotted on a vertical axis of a graph, and the frequency values of the cyclostationary noise are plotted on a horizontal axis of the same graph, then the shape of the resulting envelope may preferably remain approximately the unchanged over different time frames. The overall shape of the resulting envelope typically depends upon the particular cyclostationary noise. However, the overall amplitude of the resulting envelope will vary over successive time frames, depending upon the cyclic characteristics of the cyclostationary noise.

In the FIG. 5 embodiment, characterization module 316 may then preferably perform a cyclostationary noise characterization process to generate target stationary noise 522 via path 516. One technique for performing the foregoing cyclostationary noise characterization process is further discussed below in conjunction with FIGS. 6 and 7. Target stationary noise 522 may then be provided to conversion module 318 via path 524.

In the FIG. 5 embodiment, conversion module 318 may preferably receive an original training database 320 via path 526. The original training database was preferably recorded for training recognizer 418 of speech module 310 based upon an intended speech recognition vocabulary of speech module 310.

In the FIG. 5 embodiment, conversion module 318 may then preferably generate a modified training database 322 via path 528 by utilizing target stationary noise 522 from path 524 to modify original training database 320. In practice, conversion module 318 may add target stationary noise 522 to original training database 320 to produce modified training database 322 that then advantageously incorporates the characteristics of original cyclostationary noise 314 to thereby improve the performance of speech module 310.

In the FIG. 5 embodiment, training module 324 may then access modified training database 322 via path 529 to effectively train recognizer 418 via path 530. Techniques for training a speech recognizer are further discussed in "Fundamentals Of Speech Recognition," by Lawrence Rabiner and Biing-Hwang Juang, 1993, Prentice-Hall, Inc., which is hereby incorporated by reference. Following the foregoing training process, speech module 310 may then effectively utilize the trained recognizer 418 as discussed above in conjunction with FIGS. 4 and 5 to optimally perform various speech recognition functions.

Figure 6:
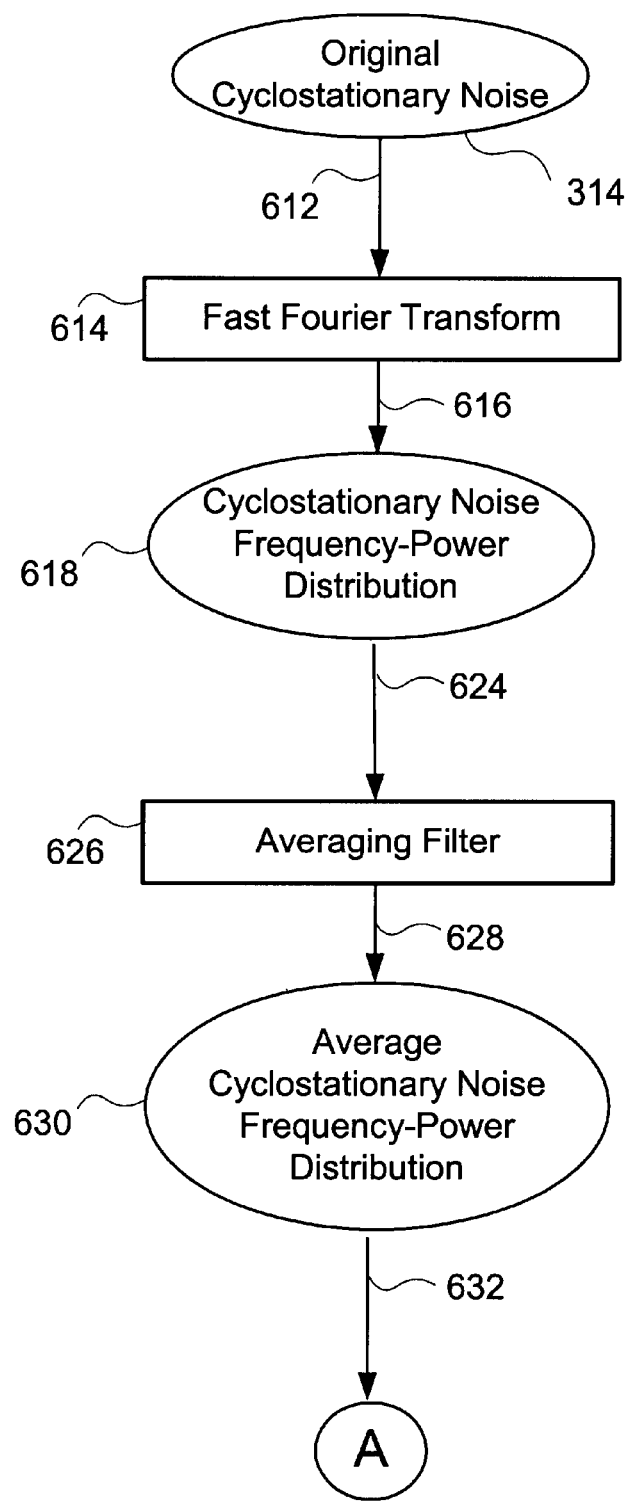
FIG. 6 is a diagram illustrating a cyclostationary noise characterization process, in accordance with one embodiment of the present invention.

Referring now to FIG. 6, a diagram illustrating a cyclostationary noise characterization process is shown, in accordance with one embodiment of the present invention. The foregoing cyclostationary noise characterization process may preferably be performed by characterization module 316 as an initial part of a cyclostationary noise characterization procedure, as discussed above in conjunction with FIG. 5, and as discussed below in conjunction with step 814 of FIG. 8. In alternate embodiments, the present invention may perform a cyclostationary noise characterization process by utilizing various other elements or functionalities in addition to, or instead of, those elements or functionalities discussed in conjunction with the FIG. 6 embodiment.

In addition, the FIG. 6 embodiment is discussed within the context cyclostationary noise of in an intended operating environment of a speech recognition system. However, in alternate embodiments, the principles and techniques of the present invention may similarly be utilized to compensate for various other types of acoustic properties. For example, various techniques of the present invention may be utilized to compensate for various other types of noise and other acoustic artifacts.

In the FIG. 6 embodiment, initially, original cyclostationary noise 314 from an intended operating environment of speech module 310 may preferably be captured and provided to a Fast Fourier Transform (FFT) 614 of characterization module 316 via path 612. FFT 614 may then preferably generate frequency-domain data by converting the original cyclostationary noise 314 from the time domain to the frequency domain to produce cyclostationary noise frequency-power distribution 618 via path 616. Fast Fourier transforms are discussed in "Digital Signal Processing Principles, Algorithms and Applications," by John G. Proakis and Dimitris G. Manolakis, 1992, Macmillan Publishing Company, (in particular, pages 706–708) which is hereby incorporated by reference.

In certain embodiments, cyclostationary noise frequency-power distribution 618 may include an array file with groupings of power values that each correspond to a different frequency, and wherein the groupings each correspond to a different time frame. In other words, cyclostationary noise frequency-power distribution 618 may preferably include an individual cyclostationary power value for each frequency across multiple time frames.

In the FIG. 6 embodiment, an averaging filter 626 may then access cyclostationary noise frequency-power distribution 618 via path 624, and responsively generate an average cyclostationary noise frequency-power distribution 630 on path 628 using any effective techniques or methodologies. In the FIG. 6 embodiment, averaging filter 626 may preferably calculate an average power value for each frequency of cyclostationary noise frequency-power distribution 618 across the different time frames to thereby produce average cyclostationary noise frequency-power distribution 630 which then includes the stationary characteristics of original cyclostationary noise 314.

In the FIG. 5 embodiment, averaging filter 626 may preferably perform an averaging operation according to the following formula:

$$\text{Average } CS \text{ Power}_k = \frac{1}{N} \sum_{t=1}^{N} CS \text{ Power}_k(t)$$

where "k" represents frequency, "t" represents time frame, "N" represents total number of time frames, CS Power is a cyclostationary noise power value from cyclostationary noise frequency-power distribution 618, and Average CS Power is an average cyclostationary noise power value from average cyclostationary noise frequency-power distribution 630.

In the FIG. 6 embodiment, a modulation module 726 (FIGS. 3 and 7) may then access average cyclostationary noise frequency-power distribution 630 via path 632 and letter "A", as further discussed below in conjunction with FIG. 7.

Figure 7:
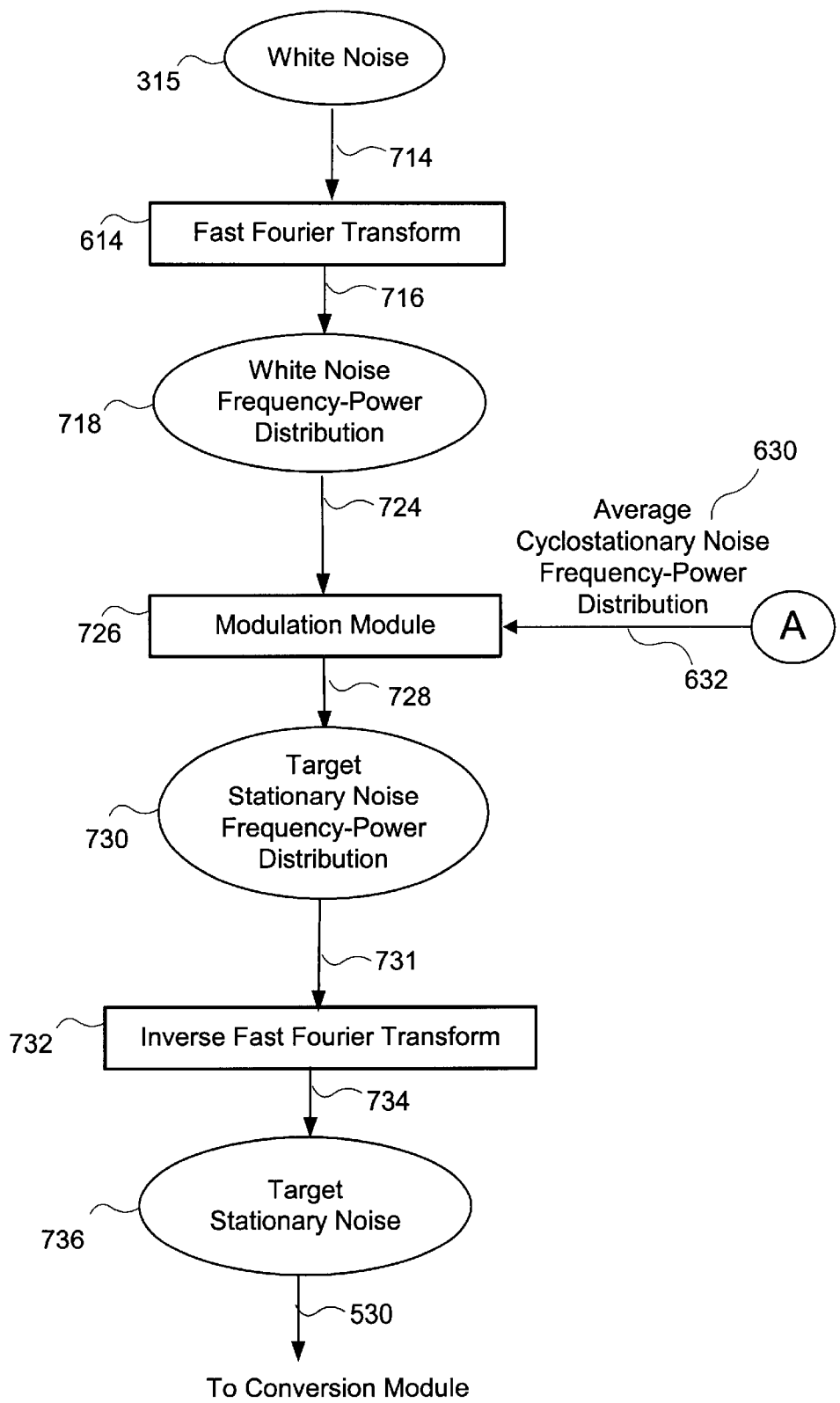
FIG. 7 is a diagram illustrating a target noise generation process, in accordance with one embodiment of the present invention.

Referring now to FIG. 7, a diagram illustrating a target noise generation process is shown, in accordance with one embodiment of the present invention. The foregoing target noise generation process may preferably be performed by characterization module 316 as a final part of a cyclostationary noise characterization procedure, as discussed above in conjunction with FIG. 5, and as discussed below in conjunction with step 814 of FIG. 8. In alternate embodiments, the present invention may readily perform a target noise generation process by utilizing various other elements or functionalities in addition to, or instead of, those elements or functionalities discussed in conjunction with the FIG. 7 embodiment.

In addition, the FIG. 7 embodiment is discussed within the context of cyclostationary noise in an intended operating environment of a speech recognition system. However, in alternate embodiments, the principles and techniques of the present invention may similarly be utilized to compensate for various other types of acoustic characteristics. For example, various techniques of the present invention may be utilized to compensate for various other types of noise and other acoustic artifacts.

In the FIG. 7 embodiment, initially, white noise 315 with a flat power distribution across a frequency range may preferably be provided to a Fast Fourier Transform (FFT) 614 of characterization module 316 via path 714. FFT 614 may then preferably generate frequency-domain data by converting the white noise 315 from the time domain to the frequency domain to produce white noise frequency-power distribution 718 via path 716. In the FIG. 7 embodiment, white noise frequency-power distribution 718 may preferably include a series of white noise power values that each correspond to a given frequency.

In the FIG. 7 embodiment, a modulation module 726 of characterization module 316 may preferably access white noise frequency-power distribution 718 via path 724, and may also access average cyclostationary noise frequency-power distribution 630 via letter "A" and path 632 from foregoing FIG. 6. Modulation module 726 may then modulate white noise power values of white noise frequency-power distribution 718 with corresponding cyclostationary power values from average cyclostationary noise frequency-power distribution 630 to generate target stationary noise frequency-power distribution 730 via path 728.

In certain embodiments, modulation module 726 may preferably generate individual target stationary power values of target stationary noise frequency-power distribution 730 by multiplying individual white noise power values of white noise frequency-power distribution 718 with corresponding individual cyclostationary power values from average cyclostationary noise frequency-power distribution 630 on a frequency-by-frequency basis. In the FIG. 7 embodiment, modulation module 726 may preferably modulate white noise frequency-power distribution 718 with average cyclostationary noise frequency-power distribution 630 in accordance with the following formula.

$$\text{Target } SN \text{ Power}(t)_k = \text{White Noise Power}(t)_k \times \text{Average } CS \text{ Power}_k$$

where "k" represents frequency, "t" represents time frame, White Noise Power is a white noise power value from white noise frequency-power distribution 718, Average CS Power is an average cyclostationary noise power value from average cyclostationary noise frequency-power distribution 630, and Target SN Power is a target stationary noise power value from target stationary noise frequency-power distribution 730.

In the FIG. 7 embodiment, an Inverse Fast Fourier Transform (IFFT) 732 may then access target stationary noise frequency-power distribution 730 via path 731, and may preferably generate target stationary noise 736 on path 734 by converting target stationary noise frequency-power distribution 730 from the frequency domain to the time domain. Conversion module 318 (FIG. 5) may then access target stationary noise 736 via path 524, as discussed above in conjunction with foregoing FIG. 5.

Figure 8:
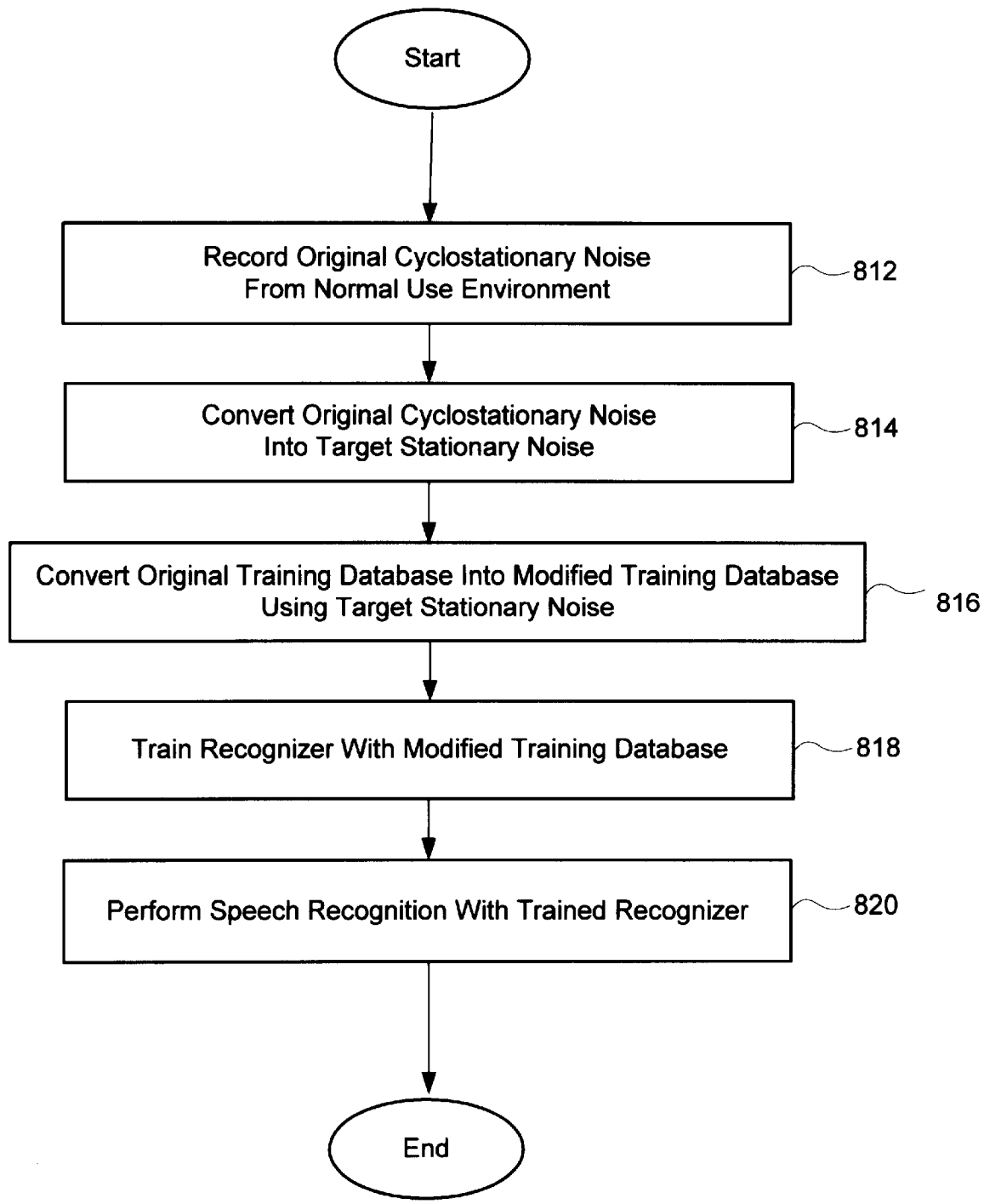
FIG. 8 is a flowchart of method steps for performing a cyclostationary noise equalization procedure, in accordance with one embodiment of the present invention.

Referring now to FIG. 8, a flowchart of method steps for performing a cyclostationary noise equalization procedure is shown, in accordance with one embodiment of the present invention. The FIG. 8 embodiment is presented for purposes of illustration, and in alternate embodiments, the present invention may readily utilize various steps and sequences other than those discussed in conjunction with the FIG. 8 embodiment.

In addition, the FIG. 8 embodiment is discussed within the context cyclostationary noise in an intended operating environment of a speech recognition system. However, in alternate embodiments, the principles and techniques of the present invention may be similarly utilized to compensate for various other types of acoustic properties. For example, various techniques of the present invention may be utilized to compensate for various other types of noise and other acoustic artifacts.

In the FIG. 8 embodiment, in step 812, original cyclostationary noise 314 from an intended operating environment of speech module 310 may preferably be captured and provided to a characterization module 316. In step 814, characterization module 316 may then preferably perform a cyclostationary noise characterization process to generate target stationary noise 522, as discussed above in conjunction with FIGS. 6 and 7.

In step 816 of the FIG. 8 embodiment, a conversion module 318 may preferably access an original training database 320, and may then responsively generate a modified training database 322 by utilizing target stationary noise 522 to modify the original training database 320. In certain embodiments, conversion module 318 may add target stationary noise 522 to original training database 320 to produce modified training database 322 that then advantageously incorporates characteristics of original cyclostationary noise 314 to thereby improve speech recognition operations.

In the FIG. 8 embodiment, a training module 324 may then access modified training database 322 to effectively train a recognizer 418 in a speech module 310. Following the foregoing training process, the speech module 310 may then effectively utilize the trained recognizer 418 as discussed above in conjunction with FIGS. 4 and 5 to optimally perform various speech recognition functions.

The invention has been explained above with reference to a preferred embodiment. Other embodiments will be apparent to those skilled in the art in light of this disclosure. For example, the present invention may readily be implemented using configurations and techniques other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for performing a cyclostationary noise equalization procedure in a speech recognition device, comprising:
   a characterization module configured to convert original cyclostationary noise data from an operating environment of said speech recognition device into target stationary noise data by performing a cyclostationary noise characterization process; and
   a conversion module coupled to said characterization module for converting an original training database into a modified training database by incorporating said target stationary noise data into said original training database, said modified training database then being utilized to train a recognizer from said speech recognition device.

2. The system of claim 1 wherein said speech recognition device is implemented as part of a robotic device to compensate for cyclostationary noise in said operating environment of said robotic device.

3. The system of claim 1 wherein said original cyclostationary noise data is recorded, digitized, and stored in a memory device for access by said characterization module.

4. The system of claim 1 wherein a Fast Fourier Transform of said characterization module converts said original cyclostationary noise data from a time domain to a frequency domain to produce a cyclostationary noise frequency-power distribution.

5. The system of claim 4 wherein said cyclostationary noise frequency-power distribution includes an array file with groupings of power values that each correspond to a different cyclostationary frequency, and wherein said groupings each correspond to a different time frame.

6. The system of claim 4 wherein an averaging filter accesses said cyclostationary noise frequency-power distribution, and responsively generates an average cyclostationary noise frequency-power distribution.

7. The system of claim 6 wherein said averaging filter calculates an average cyclostationary power value for each frequency of said cyclostationary noise frequency-power distribution across different time frames to thereby produce said average cyclostationary noise frequency-power distribution which characterizes stationary noise characteristics of said original cyclostationary noise data.

8. The system of claim 6 wherein said averaging filter performs an averaging operation according to a following formula:

$$\text{Average } CS \text{ Power}_k = \frac{1}{N}\sum_{t=1}^{N} CS \text{ Power}_k(t)$$

where said "k" represents a frequency, said "t" represents a time frame, said "N" represents a total number of time frames, said CS Power is a cyclostationary noise power value from said cyclostationary noise frequency-power distribution, and said Average CS Power is an average cyclostationary power value from said average cyclostationary noise frequency-power distribution.

9. The system of claim 6 wherein said characterization module accesses white noise data that has a uniform power distribution across a given frequency range.

10. The system of claim 9 wherein said Fast Fourier Transform of said characterization module converts said white noise data from said time domain to said frequency domain to produce a white noise frequency-power distribution.

11. The system of claim 10 wherein said white noise frequency-power distribution includes a series of white noise power values that each correspond to a particular frequency.

12. The system of claim 10 wherein a modulation module of said characterization module utilizes said white noise frequency-power distribution and said average cyclostationary noise frequency-power distribution to generate a target stationary noise frequency-power distribution.

13. The system of claim 12 wherein said modulation module modulates said white noise power values of said white noise frequency-power distribution with corresponding ones of said cyclostationary power values from said average cyclostationary noise frequency-power distribution to thereby generate said target stationary noise frequency-power distribution.

14. The system of claim 12 wherein said modulation module generates individual target stationary power values of said target stationary noise frequency-power distribution by multiplying individual ones of said white noise power values from said white noise frequency-power distribution with corresponding ones of said cyclostationary power values from said average cyclostationary noise frequency-power distribution on a frequency-by-frequency basis.

15. The system of claim 12 wherein said modulation module modulates said white noise frequency-power distribution with said average cyclostationary noise frequency-power distribution in accordance with a following formula:

$$\text{Target } SN \text{ Power}(t)_k = \text{White Noise Power}(t)_k \times \text{Average } CS \text{ Power}_k$$

where said "k" represents a frequency, said "t" represents a time frame, said White Noise Power is a white noise power value from said white noise frequency-power distribution, said Average CS Power is an average cyclostationary power value from said average cyclostationary noise frequency-power distribution, and said Target SN Power is a target stationary power value from said target stationary noise frequency-power distribution.

16. The system of claim 12 wherein an Inverse Fast Fourier Transform accesses said target stationary noise frequency-power distribution to generate target stationary noise data by converting said target stationary noise frequency-power distribution from said frequency domain to said time domain.

17. The system of claim 16 wherein a conversion module accesses an original training database that was recorded for training said recognizer based upon an intended speech recognition vocabulary of said speech recognition system, said conversion module responsively generating a modified training database by utilizing said target stationary noise data to modify said original training database.

18. The system of claim 17 wherein said conversion module adds said target stationary noise data to said original training database to produce said modified training database that then incorporates characteristics of said original cyclostationary noise data to thereby improve performance characteristics of said speech recognition device.

19. The system of claim 17 wherein a training module accesses said modified training database to perform a speech recognition training procedure to train said recognizer.

20. The system of claim 19 wherein said speech recognition device utilizes said recognizer after said speech recognition training procedure with said modified training database has been completed to thereby optimally perform various speech recognition functions.

21. A method for performing a cyclostationary noise equalization procedure in a speech recognition device, comprising the steps of:
converting original cyclostationary noise data from an operating environment of said speech recognition device into target stationary noise data with a characterization module by performing a cyclostationary noise characterization process;
converting an original training database into a modified training database with a conversion module by incorporating said target stationary noise data into said original training database; and
training a recognizer from said speech recognition device by utilizing said modified training database.

22. The method of claim 21 wherein said speech recognition device is implemented as part of a robotic device to compensate for cyclostationary noise in said operating environment of said robotic device.

23. The method of claim 21 wherein said original cyclostationary noise data is recorded, digitized, and stored in a memory device for access by said characterization module.

24. The method of claim 21 wherein a Fast Fourier Transform of said characterization module converts said original cyclostationary noise data from a time domain to a frequency domain to produce a cyclostationary noise frequency-power distribution.

25. The method of claim 24 wherein said cyclostationary noise frequency-power distribution includes an array file with groupings of power values that each correspond to a different cyclostationary frequency, and wherein said groupings each correspond to a different time frame.

26. The method of claim 24 wherein an averaging filter accesses said cyclostationary noise frequency-power distribution, and responsively generates an average cyclostationary noise frequency-power distribution.

27. The method of claim 26 wherein said averaging filter calculates an average cyclostationary power value for each frequency of said cyclostationary noise frequency-power distribution across different time frames to thereby produce said average cyclostationary noise frequency-power distribution which characterizes stationary noise characteristics of said original cyclostationary noise data.

28. The method of claim 26 wherein said averaging filter performs an averaging operation according to a following formula:

$$\text{Average } CS \text{ Power}_k = \frac{1}{N}\sum_{t=1}^{N} CS \text{ Power}_k(t)$$

where said "k" represents a frequency, said "t" represents a time frame, said "N" represents a total number of time frames, said CS Power is a cyclostationary noise power value from said cyclostationary noise frequency-power distribution, and said Average CS Power is an average cyclostationary power value from said average cyclostationary noise frequency-power distribution.

29. The method of claim 26 wherein said characterization module accesses white noise data that has a uniform power distribution across a given frequency range.

30. The method of claim 29 wherein said Fast Fourier Transform of said characterization module converts said white noise data from said time domain to said frequency domain to produce a white noise frequency-power distribution.

31. The method of claim 30 wherein said white noise frequency-power distribution includes a series of white noise power values that each correspond to a particular frequency.

32. The method of claim 30 wherein a modulation module of said characterization module utilizes said white noise frequency-power distribution and said average cyclostationary noise frequency-power distribution to generate a target stationary noise frequency-power distribution.

33. The method of claim 32 wherein said modulation module modulates said white noise power values of said white noise frequency-power distribution with corresponding ones of said cyclostationary power values from said average cyclostationary noise frequency-power distribution to thereby generate said target stationary noise frequency-power distribution.

34. The method of claim 32 wherein said modulation module generates individual target stationary power values of said target stationary noise frequency-power distribution by multiplying individual ones of said white noise power values from said white noise frequency-power distribution with corresponding ones of said cyclostationary power values from said average cyclostationary noise frequency-power distribution on a frequency-by-frequency basis.

35. The method of claim 32 wherein said modulation module modulates said white noise frequency-power distribution with said average cyclostationary noise frequency-power distribution in accordance with a following formula:

Target $SN$ Power$(t)_k$=White Noise Power$(t)_k$×Average $CS$ Power$_k$ where said "k" represents a frequency, said "t" represents a time frame, said White Noise Power is a white noise power value from said white noise frequency-power distribution, said Average CS Power is an average cyclostationary power value from said average cyclostationary noise frequency-power distribution, and said Target SN Power is a target stationary power value from said target stationary noise frequency-power distribution.

36. The method of claim 32 wherein an Inverse Fast Fourier Transform accesses said target stationary noise frequency-power distribution to generate target stationary noise data by converting said target stationary noise frequency-power distribution from said frequency domain to said time domain.

37. The method of claim 36 wherein a conversion module accesses an original training database that was recorded for training said recognizer based upon an intended speech recognition vocabulary of said speech recognition system, said conversion module responsively generating a modified training database by utilizing said target stationary noise data to modify said original training database.

38. The method of claim 37 wherein said conversion module adds said target stationary noise data to said original training database to produce said modified training database that then incorporates characteristics of said original cyclostationary noise data to thereby improve performance characteristics of said speech recognition device.

39. The method of claim 37 wherein a training module accesses said modified training database to perform a speech recognition training procedure to train said recognizer.

40. The method of claim 39 wherein said speech recognition device utilizes said recognizer after said speech recognition training procedure with said modified training database has been completed to thereby optimally perform various speech recognition functions.

41. An apparatus for performing a cyclostationary noise equalization procedure in a speech recognition device, comprising:

means for converting original cyclostationary noise data from an operating environment of said speech recognition device into target stationary noise data by performing a cyclostationary noise characterization process;

means for converting an original training database into a modified training database by incorporating said target stationary noise data into said original training database; and means for training a recognizer from said speech recognition device by utilizing said modified training database.

42. A computer-readable medium comprising program instructions for performing a cyclostationary noise equalization procedure in a speech recognition device by performing the steps of:

converting original cyclostationary noise data from an operating environment of said speech recognition device into target stationary noise data with a characterization module by performing a cyclostationary noise characterization process;

converting an original training database into a modified training database with a conversion module by incorporating said target stationary noise data into said original training database; and training a recognizer from said speech recognition device by utilizing said modified training database.

43. A system for performing a noise equalization procedure in a speech recognition device, comprising:

a characterization module configured to convert original noise data from an operating environment of said speech recognition device into target noise data; and a conversion module coupled to said characterization module for converting an original training database into a modified training database by incorporating said target noise data into said original training database, said modified training database then being utilized to train a recognizer from said speech recognition device.

* * * * *